(12) United States Patent
Arsoski et al.

(10) Patent No.: US 12,392,219 B2
(45) Date of Patent: Aug. 19, 2025

(54) BALL DEFLECTOR FOR FLOAT COLLAR

(71) Applicant: DOWNHOLE PRODUCTS LIMITED, Aberdeen (GB)

(72) Inventors: Darko Arsoski, Angus (GB); Douglas Brian Farley, Missouri City, TX (US); Christopher Hay, Aberdeen (GB)

(73) Assignee: DOWNHOLE PRODUCTS LIMITED

( * ) Notice: Subject to any disclaimer, the term of this patent is extended or adjusted under 35 U.S.C. 154(b) by 0 days.

(21) Appl. No.: 18/656,053

(22) Filed: May 6, 2024

(65) Prior Publication Data

US 2025/0043638 A1    Feb. 6, 2025

Related U.S. Application Data

(60) Provisional application No. 63/516,551, filed on Jul. 31, 2023.

(51) Int. Cl.
*E21B 33/14* (2006.01)
*E21B 21/10* (2006.01)

(52) U.S. Cl.
CPC .............. *E21B 33/14* (2013.01); *E21B 21/10* (2013.01)

(58) Field of Classification Search
CPC ................................ E21B 33/14; E21B 21/10
See application file for complete search history.

(56) References Cited

U.S. PATENT DOCUMENTS

| | | | | |
|---|---|---|---|---|
| 2,153,034 | A | * | 4/1939 | Baker ................... E21B 21/10 166/194 |
| 4,286,659 | A | * | 9/1981 | Bolding, Jr. ............ E21B 21/10 210/451 |
| 4,286,664 | A | * | 9/1981 | Bolding, Jr. ............ E21B 21/10 137/903 |
| 4,338,999 | A | | 7/1982 | Carter, Jr. |
| 5,234,052 | A | * | 8/1993 | Coone ..................... E21B 21/10 166/155 |
| 5,246,069 | A | * | 9/1993 | Glaser ................... E21B 33/167 166/155 |
| 5,680,902 | A | | 10/1997 | Giroux |
| 6,056,053 | A | | 5/2000 | Giroux |
| 7,182,135 | B2 | | 2/2007 | Szarka |

OTHER PUBLICATIONS

Extended European search report dated Oct. 1, 2024 for EP application No. 24178999.9.

* cited by examiner

*Primary Examiner* — D. Andrews

(57) ABSTRACT

A float collar for use in a wellbore includes: a float valve; a tubular housing having a coupling formed at a longitudinal end thereof for assembly as part of a downhole tubular; a sheath bonding the float valve to an inner surface of the housing within a flow bore thereof, the sheath having a bore formed therein; and a ball deflector seated against a top of the sheath and having: an upper grate and a lower anchor engaged with an inner surface of the sheath adjacent the bore. The float valve, the sheath, and the ball deflector are made from materials drillable by a polycrystalline diamond compact (PDC) drill bit.

12 Claims, 9 Drawing Sheets

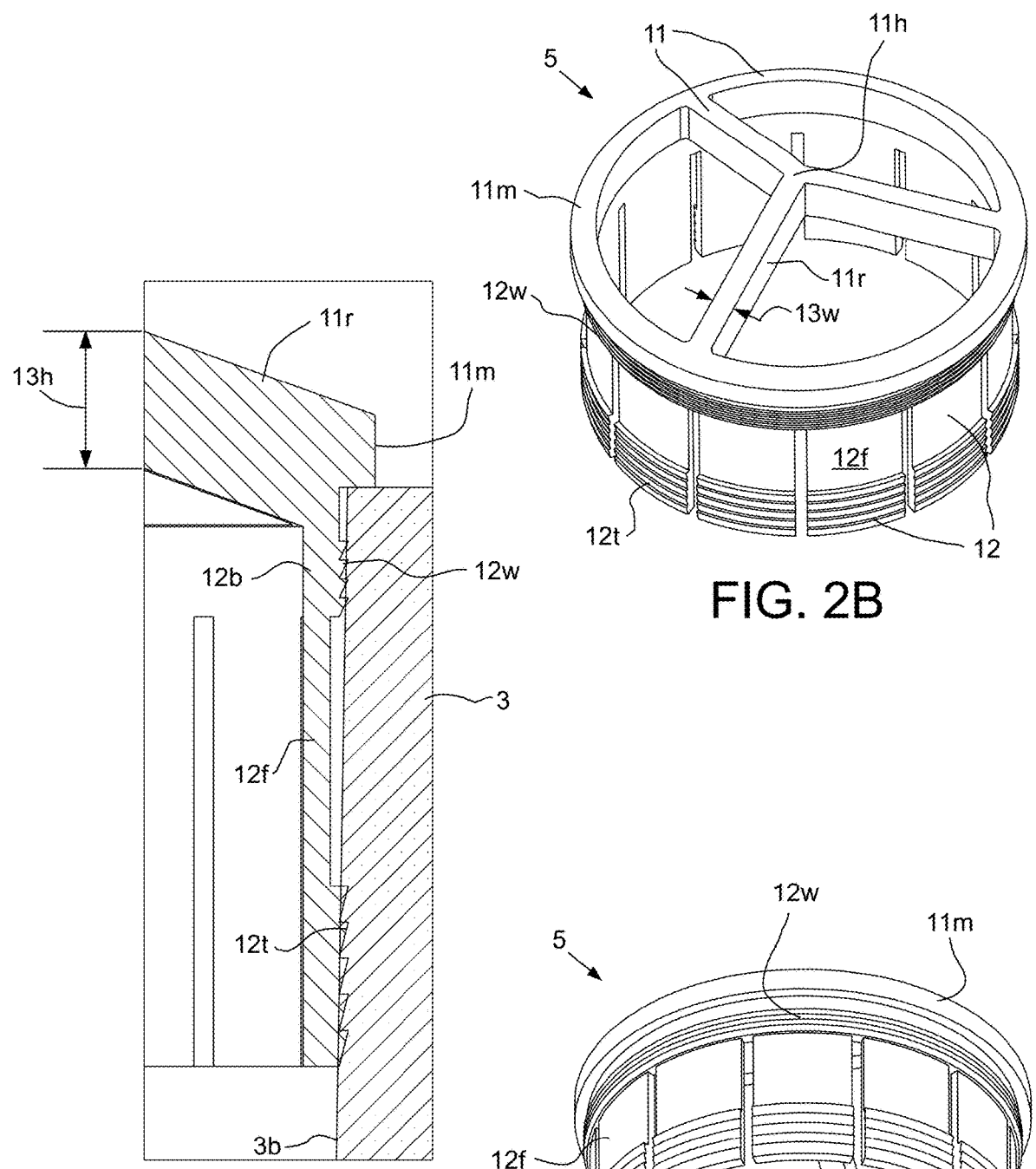

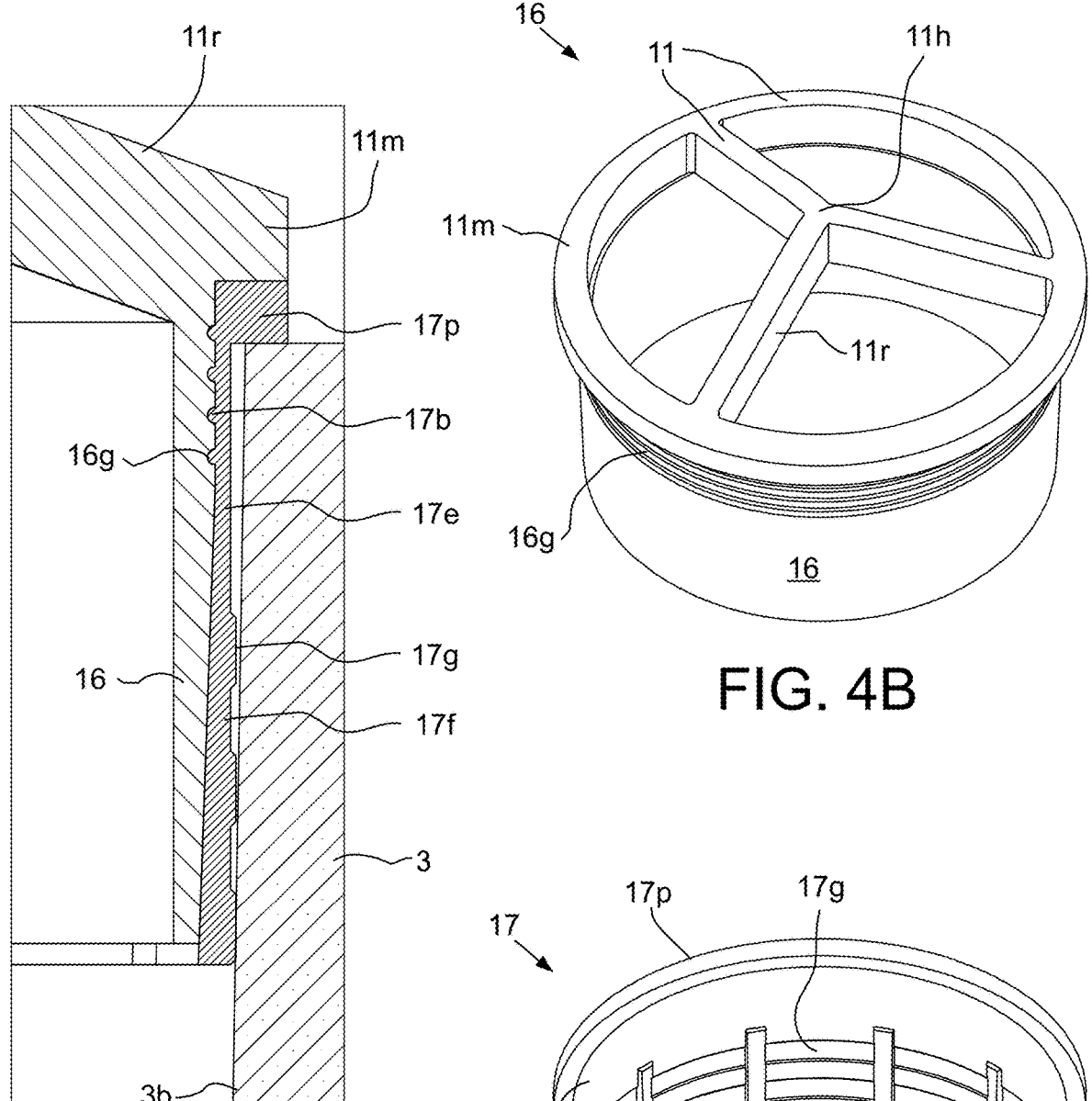
FIG. 4A
FIG. 4B
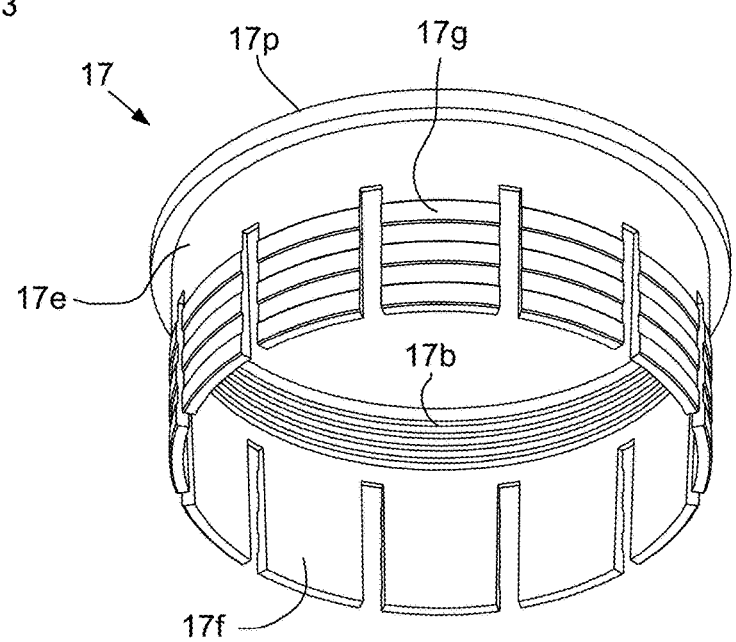
FIG. 4C

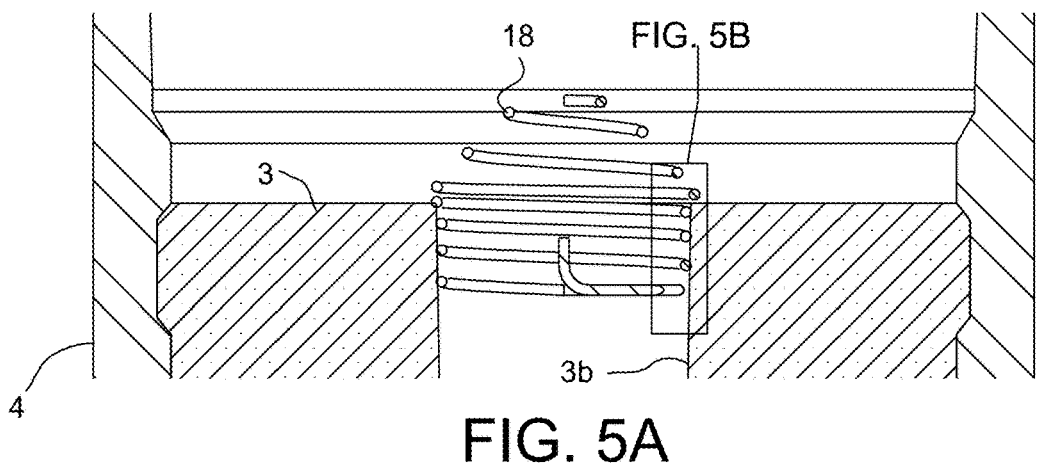
FIG. 5A
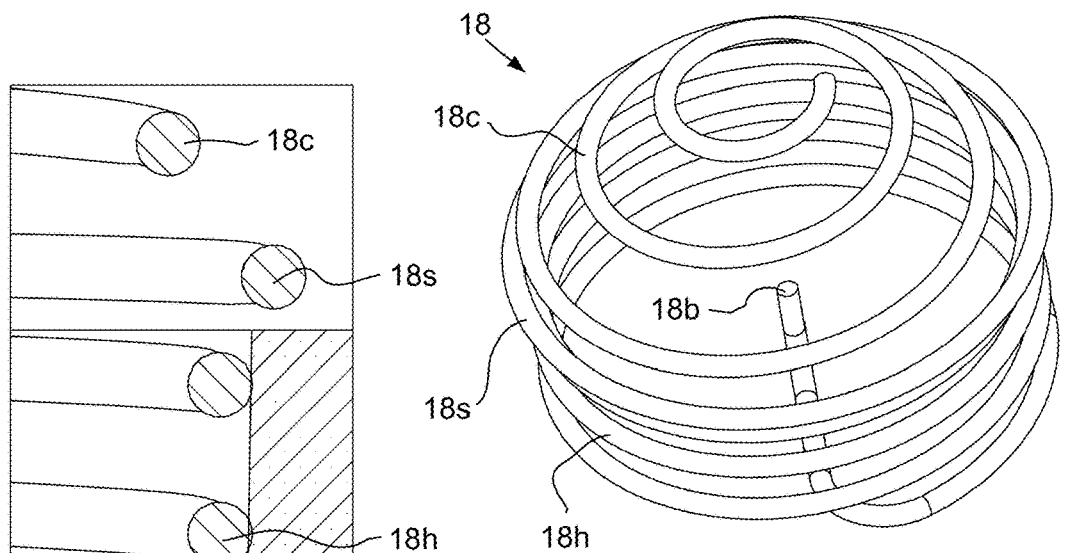
FIG. 5B
FIG. 5C
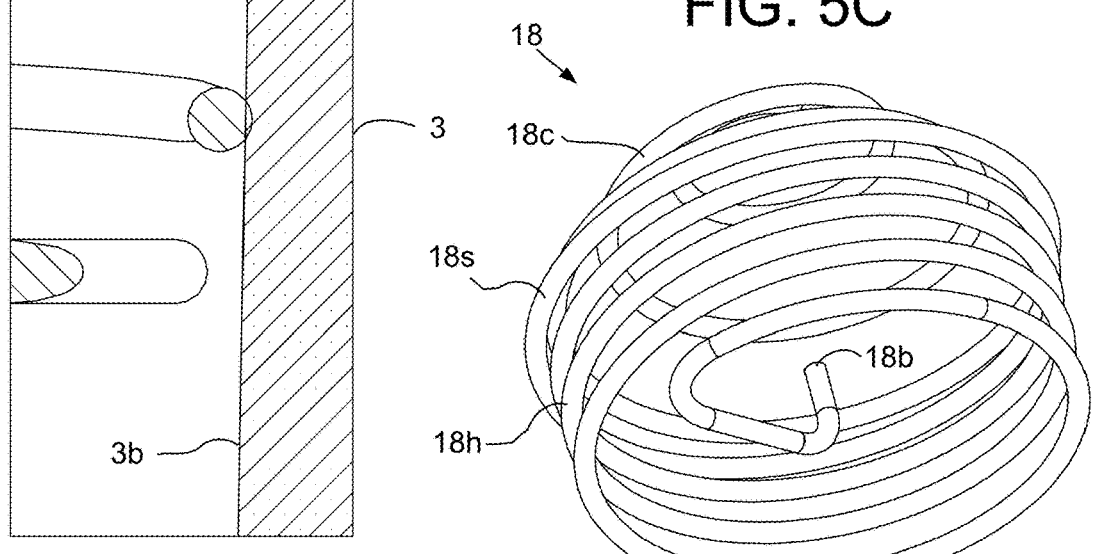
FIG. 5D

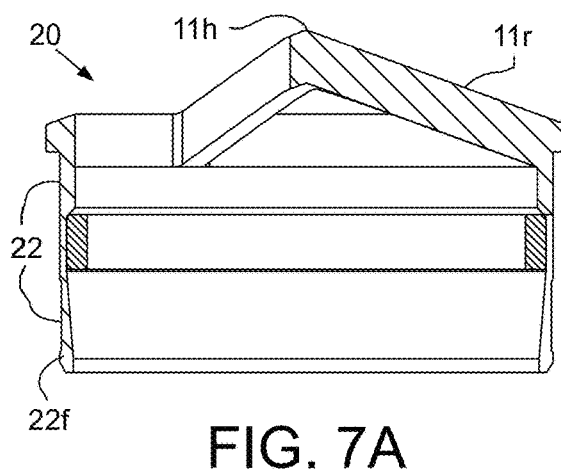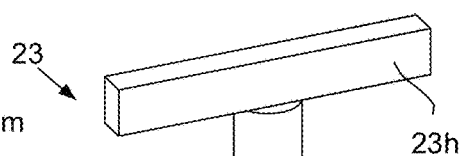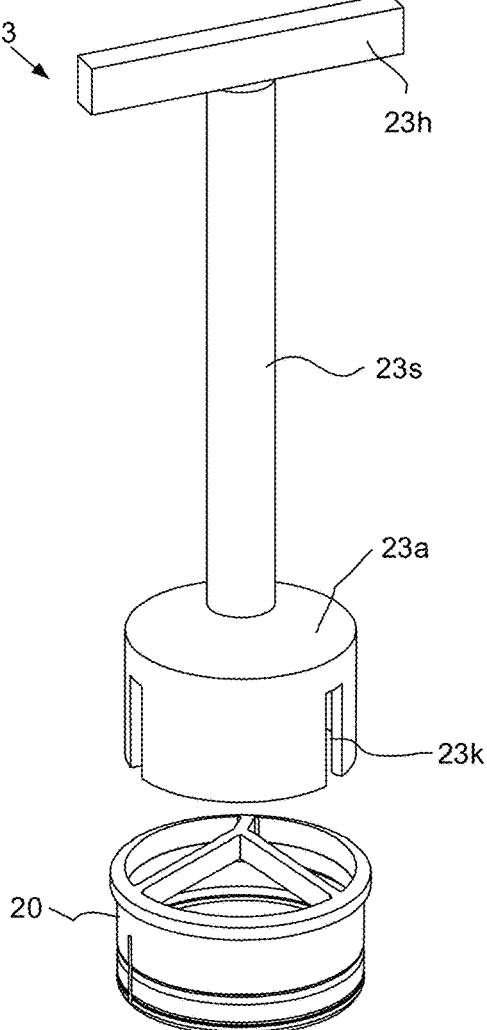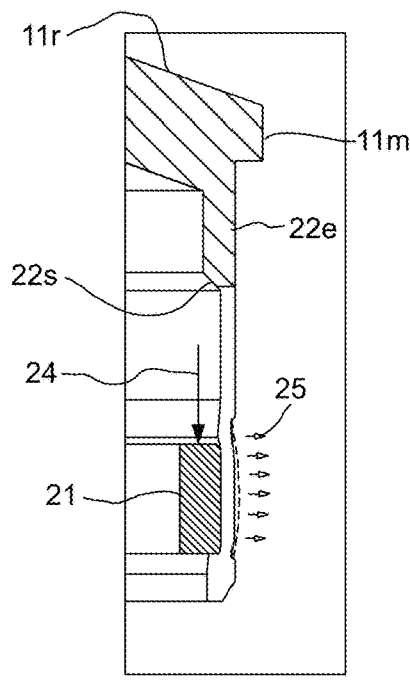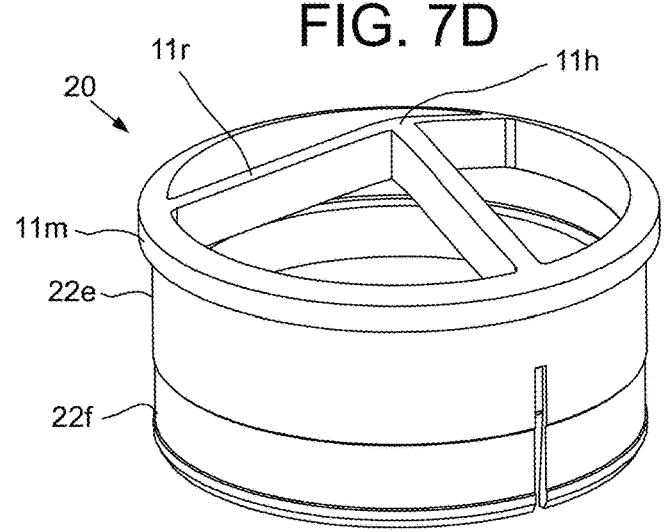
FIG. 7A
FIG. 7B
FIG. 7C
FIG. 7D
FIG. 7E

BALL DEFLECTOR FOR FLOAT COLLAR

BACKGROUND OF THE DISCLOSURE

Field of the Disclosure

The present disclosure generally relates to a ball deflector for a float collar.

Description of the Related Art

U.S. Pat. No. 5,680,902 discloses a fill valve including a tubular housing which accommodates a valve member which is biased toward a closed position by a light spring. The valve member includes a head and a tubular portion which is provided with two large windows. When the fill valve is open fluid flows freely through the tubular portion of the fill valve and out of the windows. At FIGS. 14A and 14B and the accompanying discussion, a ball seat retainer sub is disclosed.

U.S. Pat. No. 6,056,053 discloses a method for introducing wellbore cement into a wellbore shoe joint, the shoe joint having a hollow tubular body, the shoe joint containing an amount of wellbore fluid, the shoe joint disposed in a wellbore cementing system between a float shoe, guide shoe, or other flow apparatus beneath the shoe joint, and a hollow tubular member above the shoe joint, the hollow tubular member being a lower part of a wellbore tubular string of a plurality of tubular members (e.g., casing) extending from an earth surface down into a wellbore, the method including moving a wellbore wiper plug into the hollow tubular body of the shoe joint, moving the plug within the shoe joint to push wellbore fluid from the shoe joint and, in one aspect, debris in the fluid, the fluid flowing to the float shoe, guide shoe or other flow apparatus, flowing wellbore cement into the hollow tubular body of the shoe joint. At FIGS. 33A-33D and the accompanying discussion, a float collar having a landing baffle is disclosed.

U.S. Pat. No. 7,182,135 discloses a method and plug for separating fluids in subterranean wells. The plug enters a passage at an interface of successively introduced fluids. The plug comprises an outer body and a detachable inner mandrel attached to the outer body. An assembly including a plurality of plugs may also be used, in which case the plurality of plugs releasably attach to each other. At FIG. 6 and the accompanying discussion, a baffle adapter is disclosed.

SUMMARY OF THE DISCLOSURE

The present disclosure generally relates to a ball deflector for a float collar. In one embodiment, a float collar for use in a wellbore includes: a float valve; a tubular housing having a coupling formed at a longitudinal end thereof for assembly as part of a downhole tubular; a sheath bonding the float valve to an inner surface of the housing within a flow bore thereof, the sheath having a bore formed therein; and a ball deflector seated against a top of the sheath and having: an upper grate and a lower anchor engaged with an inner surface of the sheath adjacent the bore. The float valve, the sheath, and the ball deflector are made from materials drillable by a polycrystalline diamond compact (PDC) drill bit.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A is an enlargement of a portion of FIG. 1. FIGS. 2B and 2C illustrate the ball deflector.

FIG. 4A is an enlargement of a portion of FIG. 3A. FIG. 4B illustrates a mandrel of the alternative ball deflector. FIG. 4C illustrates a sleeve of the alternative ball deflector.

FIG. 5A illustrates a third float collar having a second alternative ball deflector, according to another embodiment of the present disclosure. FIG. 5B is an enlargement of a portion of FIG. 5A. FIGS. 5C and 5D illustrate the second alternative ball deflector.

FIGS. 7A and 7E illustrate a third alternative ball deflector in a disengaged position, according to another embodiment of the present disclosure. FIG. 7B illustrates the third alternative ball deflector in an engaged position. FIG. 7C is an enlargement of a portion of FIG. 7B. FIG. 7D illustrates preparation for installation of the third alternative ball deflector into a sheath of a float collar.

DETAILED DESCRIPTION

Figure 1:
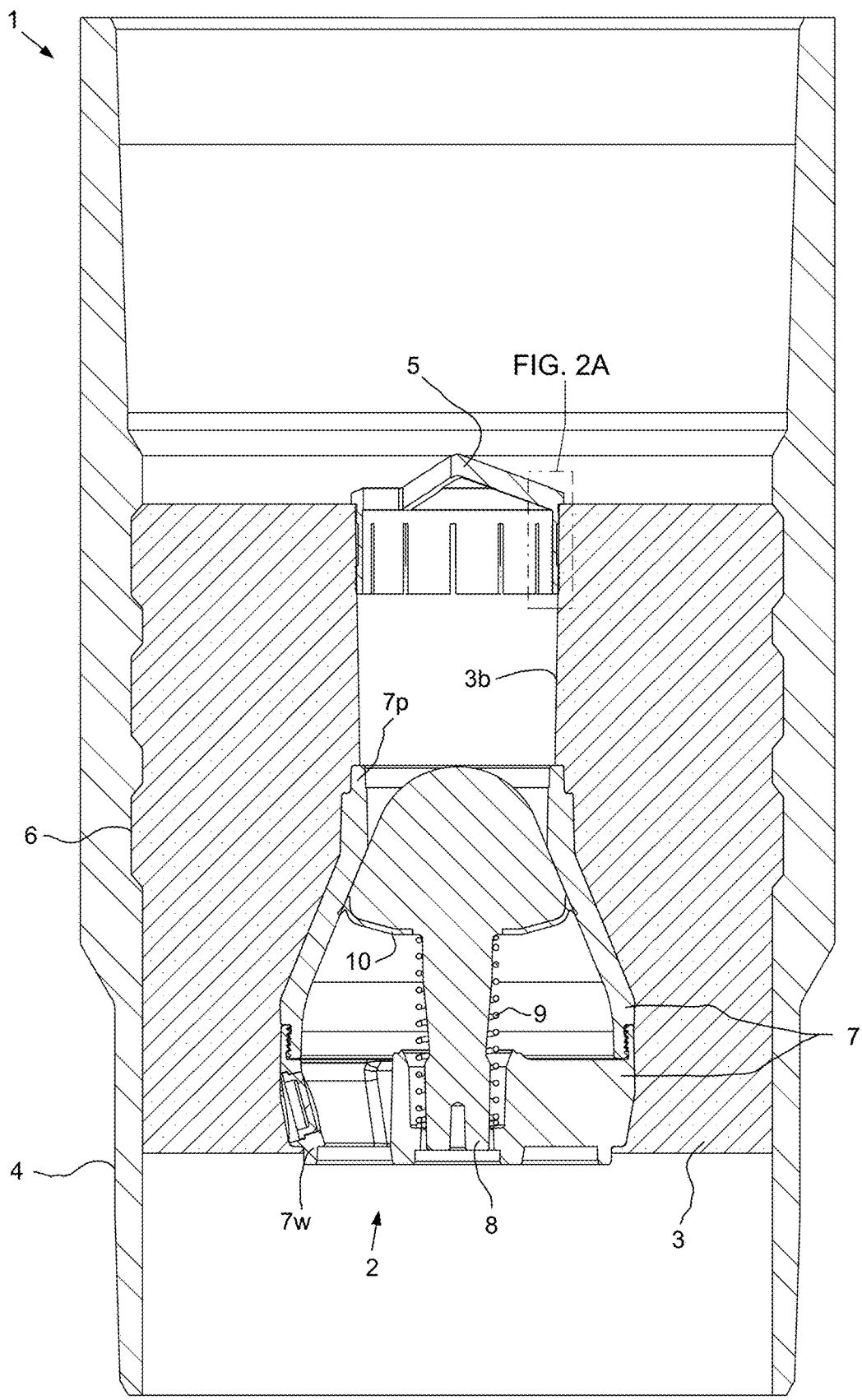
FIG. 1 illustrates a float collar having a ball deflector, according to one embodiment of the present disclosure.

FIG. 1 illustrates a float collar 1 having a ball deflector 5, according to one embodiment of the present disclosure. The float collar 1 may include a float valve 2, a sheath 3, a housing 4, and the ball deflector 5. The housing 4 may be tubular and may have a coupling formed at each longitudinal end thereof, such as a threaded pin or box, for assembly as part of a downhole tubular (not shown), such as a casing or liner string.

The float collar 1 may be assembled with and at a lower portion of the downhole tubular. The housing 4 may have an array of grooves 6 formed in and along an inner surface thereof to facilitate bonding with the sheath 3. The housing 4 may be made from a metal or alloy, such as steel. The float valve 2, sheath 3, and ball deflector 5 may be made from materials drillable by a polycrystalline diamond compact (PDC) drill bit, such as a nonferrous material. By nonferrous, it is meant that the material contains no more than a trace amount of iron.

The sheath 3 may be made from cement, such as Portland cement or Portland cement concrete. The sheath 3 may torsionally and longitudinally bond the float valve 2 to the housing 4 within a flow bore thereof. The sheath 3 may also seal the interface between the float valve 2 and the housing 4 to prevent fluid bypass of the float valve 2. The sheath 3 may surround the float valve 2. The float valve 2 may be located in a lower portion of the sheath 3 such that one or more lower end ports of the float valve are exposed to the flow bore of the housing 4. A top of the sheath 3 may serve as a landing shoulder for a wiper plug (not shown). The sheath 3 may have a bore 3b formed therein extending from a top thereof to a top of the upper body section 7p. sheath bore 3b may have an inner diameter slightly decreasing from the top of the sheath 3 to an interface with upper body section 7p.

Alternatively, an autofill float valve may be used instead of the float valve 2. Alternatively, the float collar 1 may include a second float valve for redundancy.

The float valve 2 may include a body 7, a valve member, such as a poppet 8 (a.k.a. plunger), and a biasing member, such as compression spring 9. The body 7 may be made from a polymer, such as a thermoplastic, thermoset, or copolymer. The body 7 may include an upper section 7p and a lower section 7w which may be connected together by a lap joint and secured, such as by adhesive or threads. The poppet 8 may have an upper head portion and a lower stem portion.

The upper body section 7p may be frusto-conical and have a valve chamber formed therein for receiving the poppet head. An outer surface of the upper body section 7p may have recesses formed therein to facilitate bonding with the sheath 3 in a torsional manner. An upper end port of the float valve 2 may be formed adjacent the top of the upper body section 7p and may be in fluid communication with the valve chamber and the bore 3b of the sheath 3. The valve chamber may extend from the upper end port of the float valve 2 along an inner surface of the upper body section 7p and through to a lower end thereof. The valve chamber may diverge from the upper end port of the float valve 2 to a lower end of the upper body section 7p except for a straight portion at the interface with the lower body section 7w.

The lower body section 7w may have a plurality of portions, such as an outer rim, an inner hub, and one or more (two shown) ribs connecting the rim and the hub. The lower end ports of the float valve 2 may be formed between the ribs of the lower body section 7w and may be in fluid communication with the valve chamber. An outer surface of the lower body section 7w may have recesses formed therein adjacent to a bottom thereof to facilitate bonding with the sheath 3 in a longitudinal and torsional manner. The hub of the lower body section 7w may have a passage formed therethrough for receiving the poppet stem. A spring chamber may be formed in an upper portion of the hub of the lower body section 7w adjacent to the passage for receiving the spring 9. A spring shoulder may be formed at a bottom of the spring chamber of the lower body section 7w.

The poppet 8 may be made from any of the materials of the body 7, discussed above. The poppet head may be mushroom-shaped and may carry a valve seal 10 on a lower portion of an outer surface thereof. The valve seal 10 may be made from an elastomer or elastomeric copolymer and may be mounted to the poppet head, such as by being molded thereon. The poppet 8 may be longitudinally movable relative to the body 7 between an open position (not shown) and a closed position (shown). The poppet head may have a stop shoulder and a spring shoulder formed at an interface with the poppet stem. In the open position, the stop shoulder of the poppet head may engage a top of the hub of the lower body section 7w.

The spring 9 may have an upper end bearing against the spring shoulder of the poppet head and a lower end bearing against the spring shoulder of the hub of the lower body section 7w, thereby biasing the poppet 8 toward the closed position. The spring 9 may be made from a non-ferrous metal or alloy. The poppet stem may extend through the hub passage of the lower body section 7w. A portion of the hub passage may serve as a guide for the poppet stem and a clearance fit, such as a sliding fit or close running fit, may be formed between an outer surface of the poppet stem and the inner surface of the hub of the lower body section 7w.

Alternatively, any of the components of the float valve 2 except the valve seal 10 may be made from any of the materials discussed above for the spring 9. Alternatively, the float collar 1 may be a float shoe instead with the relocation of the float valve 2 in a shoe of the downhole tubular and the downhole tubular may have a separate landing collar.

FIG. 2A is an enlargement of a portion of FIG. 1. FIGS. 2B and 2C illustrate the ball deflector 5. The ball deflector 5 may be made from any of the materials of the body 7, discussed above. The ball deflector 5 may be of one-piece construction. The ball deflector 5 may have an upper grate 11 and a lower anchor 12.

The grate 11 may have an outer rim 11m, an inner hub 11h, and a plurality (three shown) of ribs 11r connecting the rim and the hub. The grate 11 may have a conical shape. Ports may be formed between the ribs 11r of the grate 11 and may provide fluid communication between a bore of the housing 4 and the bore 3b of the sheath 3. A height 13h of each rib 11r may be greater than, such as at least twice, a width 13w thereof to maximize flow area of the ports. The ribs 11r may extend radially from the rim 11m to the hub 11h. The ribs 11r may also extend longitudinally from the rim 11m to the hub 11h at an inclination angle relative to a respective radial axis at an angle ranging between five and forty-five degrees. The pitched ribs 11r may urge a ball (not shown) away from the bore 3b, thereby preventing obstruction of the bore by the ball. The hub 11h may be formed by the convergence of the ribs 11r, may be at a height above the rim 11m, and may be centrally located. An upper portion of the rim 11m may have an outer diameter that is greater than a diameter of the bore 3b at the top of the sheath 3 and a lower portion of the rim may have an outer diameter that is less than a diameter of the bore at the top of the sheath and the rim may have a shoulder formed between the upper and lower portions. The shoulder of the rim 11m may seat against the top of the sheath 3 to prevent the ball deflector 5 from being driven down the bore 3b of the sheath.

The anchor 12 may include an annular base 12b and a plurality of split fingers 12f extending longitudinally from the base. The base 12b may extend from a bottom of the rim 11m. A lower portion of each finger 12f may have a plurality of circumferential teeth 12t (aka wickers) formed on an outer surface thereof. Each tooth 12t may have a cross sectional shape resembling a right triangle and the hypotenuses of the teeth of may incline toward the base 12b, thereby providing unidirectional gripping of the sheath 3 adjacent the bore 3b. The fingers 12f may be cantilevered from the base and have a stiffness biasing the fingers toward a natural position where the teeth 12t have a major diameter greater than or equal to a diameter of the bore 3b at the top of the sheath 3. Driving of the anchor 12 down the bore 3b may radially compress the fingers 12f to a retracted position where the stiffness of the fingers exerts a setting force engaging the teeth 12t with an inner surface of the sheath 3 adjacent the bore 3b. Engagement of the teeth 12t with the sheath 3 may then mount the ball deflector 5 to the sheath to prevent any upward force from removing the ball deflector from the bore 3b.

Alternatively, the anchor 12 may only have a single split finger (C-ring) instead of a plurality of split fingers 12f.

The base 12b may also have a plurality of circumferential teeth 12w formed on an outer surface thereof. The base teeth 12w may be similar to the finger teeth 12t in shape and orientation. The base teeth 12w may have a fixed major diameter equal to or slightly greater than the diameter of the bore 3b at the top of the sheath 3. The base teeth may be wedged into engagement with the inner surface of the sheath 3 adjacent the bore 3b while driving the anchor 12 into the bore 3b just before engagement of the shoulder of the rim 11m with the top of the sheath 3.

Figure 3A:
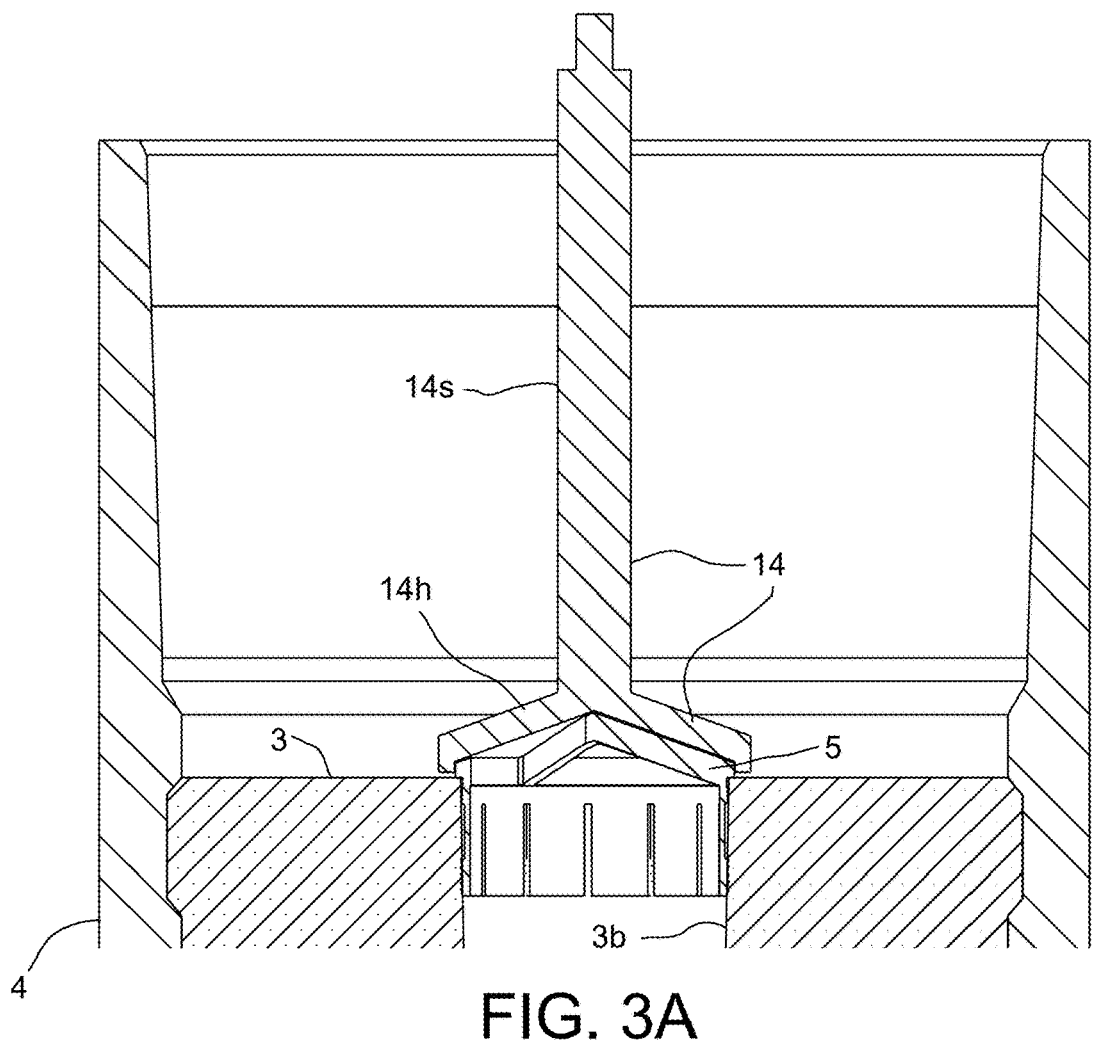
FIG. 3A illustrates installation of the ball deflector into a sheath of the float collar.

FIG. 3A illustrates installation of the ball deflector 5 into the sheath 3 of the float collar 1. An installation tool 14 may be used to facilitate insertion of the ball deflector 5 into the bore 3b. The installation tool 14 may include an adapter 14h and a shaft 14s. The adapter 14h may have a lower annular portion for receiving the rim 11m and an upper conical portion for receiving the ribs 11r and the hub 11h. The shaft 14s may extend from the adapter 14h for a length sufficient to protrude from a top of the housing 4. The ball deflector 5 may be retrofit to an existing float collar. The ball deflector 5 may be temporarily secured to the adapter 14h, such as using reusable adhesive putty or tape. The ball deflector 5 may then be lowered into the housing bore by the shaft 14s until the anchor 12 reaches the sheath bore 3b. The anchor 12 may be aligned with the sheath bore 3b and the installation tool 14 may be set down. A setting force may then be exerted on the installation tool 14 either manually or using a hammer, thereby driving the anchor 12 into the sheath bore 3b. The setting force may continue to be applied until the shoulder of the rim 11m seats against the top of the sheath 3. A removal force may then be exerted on the installation tool 14 to release the ball deflector 5 therefrom and the installation tool 14 may be removed from the housing 4.

In operation, the float collar 1 may be assembled as part of the downhole tubular and deployed into a wellbore (not shown). Once the downhole tubular has landed in the wellbore, conditioner fluid (not shown) may be pumped down the bore of the downhole tubular. The conditioner fluid may be pumped into the downhole tubular via a cementing head (not shown) connected to a top of the downhole tubular at a drilling rig at a surface of the earth or the sea. Pumping of the conditioner fluid may create a differential pressure across the poppet head, thereby moving the poppet 8 downward to the open position. A bottom wiper plug (not shown) may then be launched from the cementing head followed by a desired volume of cement slurry (not shown) via the cementing head and then a top wiper plug (not shown) may be launched from the cementing head. Chaser fluid (not shown) may then be pumped behind the top wiper plug via the cementing head and/or Kelly valve to propel the wiper plugs, and the cement slurry therebetween down the bore of the downhole tubular.

As the top wiper plug is driven through the bore of the downhole tubular, the bottom wiper plug may land onto the float collar 1. Continued pumping of the chaser fluid may increase pressure in the bore of the downhole tubular, thereby rupturing a diaphragm of the bottom wiper plug. Rupture of the diaphragm may open a flow passage through the bottom wiper plug and the cement slurry may flow through the passage, the sheath bore 3b, and the float valve 2 and into an annulus (not shown) formed between the downhole tubular and the wellbore. Pumping of the chaser fluid may continue until the top wiper plug lands onto the bottom wiper plug.

Alternatively, the downhole tubular may have a separate landing collar for receiving the bottom wiper plug.

Landing of the top wiper plug and continued pumping of the chaser fluid may increase pressure in the bore of the downhole tubular which is being monitored at the drilling rig. Once landing has been detected, pumping of the chaser fluid may be halted and the pressure in the bore of the downhole tubular may be bled, thereby removing any pressure differential across the poppet 8, allowing the spring 9 to move the poppet upwardly until the valve seal 10 carried by the poppet head engages a mating valve seat formed in an inner surface of the upper body section 7p, and sealing the valve chamber of the float valve from upward flow therethrough. Closing of the float valve 2 may prevent the cement slurry from flowing back into the bore of the downhole tubular above the float collar 1 (aka U-tubing). Once the cement slurry has cured, the wiper plugs, the float valve 2, the sheath 3, and the ball deflector 5 may be drilled out such that the wellbore may be further extended.

One or more balls may be used before the cementing operation, for example, if the downhole tubular is a liner string and a ball is pumped down the downhole tubular to set a liner hanger. The ball deflector 5 ensures that the ball(s) does not obstruct the sheath bore 3b.

As compared to the prior art, the landing baffle of U.S. Pat. No. 6,056,053 is cemented into the sheath so it cannot be retrofit to an existing float collar. Advantageously, the ball deflector 5 can simply be inserted into the sheath of an existing float collar.

Figure 3B:
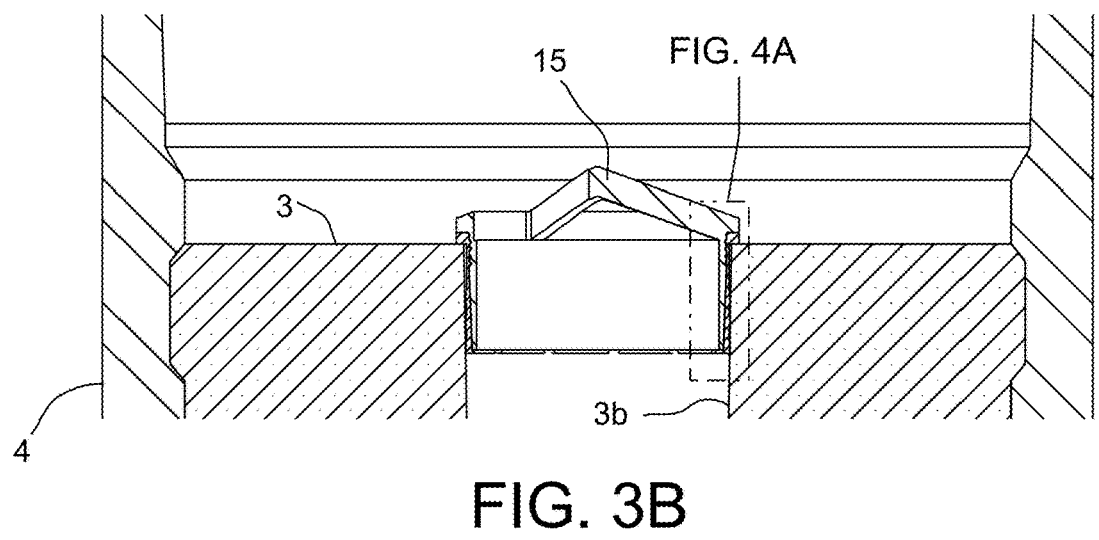
FIG. 3B illustrates a second float collar having an alternative ball deflector, according to another embodiment of the present disclosure.

FIG. 3B illustrates a second float collar having an alternative ball deflector 15, according to another embodiment of the present disclosure. The second float collar may be similar to the float collar 1 except for replacement of the ball deflector 5 with the alternative ball deflector 15.

FIG. 4B illustrates a mandrel 16 of the alternative ball deflector 15. FIG. 4C illustrates a sleeve 17 of the alternative ball deflector 15. The alternative ball deflector 15 may have the upper grate 11 and a lower anchor 16, 17. The anchor 16, 17 may include the inner mandrel 16 and the outer sleeve 17. The grate 11 and the mandrel 16 may be made from any of the materials of the body 7, discussed above. The grate 11 and the mandrel 16 may be of one-piece construction. The sleeve 17 may be made from any of materials of the body 7, discussed above.

The sleeve 17 may be disposed along and around the mandrel 16. The sleeve 17 may have a plurality of circumferential beads 17b protruding from an inner surface thereof and each bead may be received in a respective groove 16g of the mandrel 16, thereby mounting the sleeve onto the mandrel. The sleeve 17 may have an upper cap 17p with an enlarged outer diameter for mating with the shoulder of the rim 11m. The sleeve 17 may further have an annular base 17e and a plurality of split fingers 17f extending longitudinally from the base. The base 17e may extend from a bottom of the cap 17p and may have a constant outer diameter. Each finger 17f may have a plurality of circumferential lugs 17g formed in an outer surface thereof. A shoulder may be formed at the interface between the base 17e and the cap 17p. The shoulder of the sleeve 17 may have a similar diameter to the shoulder of the rim 11m to seat against the top of the sheath 3 to prevent the alternative ball deflector 15 from being driven down the bore 3b of the sheath. An inner surface of the fingers 17f may taper inwardly from a bottom of the base 17e to a bottom of the fingers. The fingers 17f may extend slightly past a bottom of the mandrel 16.

Alternatively, the sleeve 17 may only have a single split finger (C-ring) instead of a plurality of split fingers 17f.

The mandrel 16 may extend from a bottom of the rim 11m. The mandrel 16 may have an upper portion with the grooves 16g formed in an outer surface thereof. An outer surface of a lower portion of the mandrel 16 may taper inwardly from a location just below the grooves 16g to a bottom of the mandrel. A wall of the mandrel 16 may be solid (not split).

The alternative ball deflector 15 may be installed into the bore 3b using the installation tool 14. The sleeve 17 may first be placed in the bore using the installation tool 14. The fingers 17f may be cantilevered from the base 17e and have a stiffness biasing the fingers toward a natural position where the lugs 17g have a diameter slightly less than a diameter of the bore 3b at the top of the sheath 3. The grate 11 and anchor 16 may then be lowered into the housing using the installation tool 14. The mandrel 16 may be inserted into the sleeve 17 and driven therein. Driving of the mandrel 16 into the sleeve 17 may engage the tapered surfaces thereof, thereby radially expanding the lugs 17g to an expanded position where at least one set of the lugs 17g engages with an inner surface of the sheath 3 adjacent the bore 3b. Engagement of the lug(s) 17g with the sheath 3 may then mount alternative ball deflector 15 to the sheath to prevent any upward force from removing the alternative ball deflector from the bore 3b.

FIG. 5A illustrates a third float collar having a second alternative ball deflector 18, according to another embodiment of the present disclosure. FIG. 5B is an enlargement of a portion of FIG. 5A. FIGS. 5C and 5D illustrate the second alternative ball deflector 18. The third float collar may be similar to the float collar 1 except for replacement of the ball deflector 5 with the second alternative ball deflector 18. The second alternative ball deflector 18 may be of one-piece construction. The second alternative ball deflector 18 may be made from any of materials of the spring 9, discussed above.

Figure 6A:
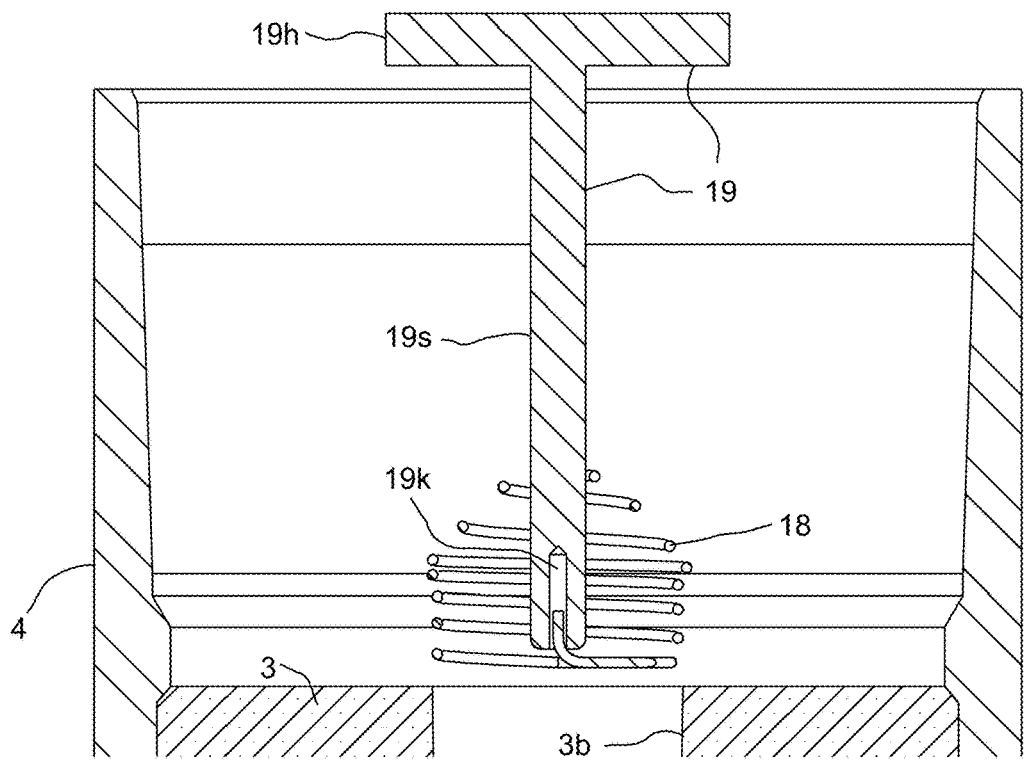
FIGS. 6A and 6B illustrate installation of the second alternative ball deflector into the sheath of the third float collar.

The second alternative ball deflector 18 may be a wire coiled into a spring and having a helical lower portion 18h, a conical upper portion 18c, and an oversized shoulder portion 18s. The helical portion 18h may serve as the anchor and the conical portion 18c may serve as the grate. A free end 18b of the helical portion 18h may be centrally located and extend upwardly for coupling to a second installation tool 19 (FIG. 6A). The shoulder portion 18s may seat against the top of the sheath 3 to prevent the ball deflector 5 from being driven down the bore 3b of the sheath. A natural outer diameter of the helical portion 18h may be greater than or equal to the diameter of the bore 3b at the top of the sheath 3. An outer diameter of the conical portion 18c may decrease from the shoulder portion 18s as the conical portion extends upward therefrom to a minimum outer diameter. The minimum outer diameter of the conical portion 18c may be substantially less than the diameter of the bore 3b at the top of the sheath 3, such as less than or equal to three-fourths, two-thirds, or one-half thereof.

Figure 6B:
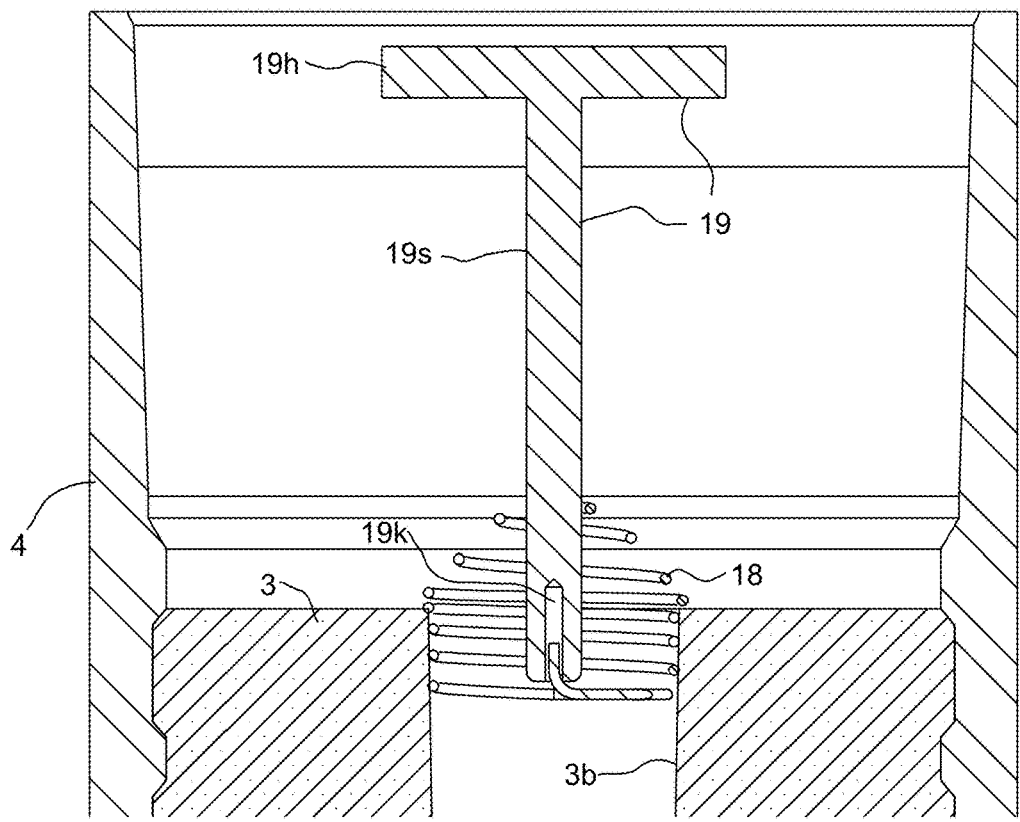

FIGS. 6A and 6B illustrate installation of the second alternative ball deflector 18 into the sheath 3 of the third float collar. A second installation tool 19 may be used to facilitate insertion of the second alternative ball deflector 18 into the bore 3b. The second installation tool 19 may include a handle 19h and a shaft 19s. The shaft 19s may have a socket 19k formed in a lower end thereof for receiving the free end 18b of the helical portion 18h. The shaft 19s may extend from the handle 19h for a length sufficient so the handle protrudes from a top of the housing 4. The second alternative ball deflector 18 may be retrofit to an existing float collar.

The free end 18b of the helical portion 18h may be inserted into the socket 19k of the second installation tool 19. The second alternative ball deflector 18 may then be lowered into the housing bore by the handle 19h until the helical portion 18h reaches the sheath bore 3b. The helical portion 18h may be aligned with the sheath bore 3b and the second installation tool 19 may be set down, thereby inserting the free end 18b and the lower end of the shaft 19s into the sheath bore 3b. A driving force may then be exerted on the second installation tool 19, thereby exerting tension on the helical portion 18h. The tension may longitudinally extend and radially compress the helical portion 18h, thereby allowing insertion of the helical portion 18h into the sheath bore 3b. The setting force may continue to be applied until the shoulder portion 18s seats against the top of the sheath 3. Ceasing application of the driving force allows stiffness of the helical portion to longitudinally retract and radially expand into engagement with the sheath bore 3b. A removal force may then be exerted on the second installation tool 19 to release the second alternative ball deflector 18 therefrom and the second installation tool 19 may be removed from the housing 4.

FIGS. 7A and 7E illustrate a third alternative ball deflector 20 in a disengaged position, according to another embodiment of the present disclosure. FIG. 7B illustrates the third alternative ball deflector 20 in an engaged position. FIG. 7C is an enlargement of a portion of FIG. 7B. FIG. 7D illustrates preparation for installation of the third alternative ball deflector 20 into a sheath (not shown) of a float collar (not shown). The third alternative ball deflector 20 may be installed into the sheath 3 of the float collar 1 instead of the ball deflector 5.

The third alternative ball deflector 20 may have the upper grate 11 and a lower anchor 21,22. The anchor 21,22 may include an inner cam ring 21 and the outer sleeve 22. The grate 11 and the sleeve 22 may be made from any of the materials of the body 7, discussed above. The grate 11 and the sleeve 22 may be of one-piece construction. The cam ring 21 may be made from any of materials of the body 7 or the spring 9, discussed above.

The sleeve 22 may have an annular base 22e and a split annular finger (C-ring) 22f extending longitudinally from the base. The base 22e may extend from a bottom of the rim 11m and may have a constant outer diameter. The base 22e may have a tapered shoulder 22s formed in an inner surface thereof at a bottom thereof adjacent to a top of the finger 22f. The finger 22f may have recess formed in an outer surface of a lower portion thereof. Although not shown, the finger 22f may have a plurality of circumferential lugs or teeth formed in an outer surface thereof along the recess thereof and protruding therefrom. The teeth or lugs may be similar to the respective teeth 12t or lugs 17g. An upper portion of the finger 22f may have a straight inner surface for receiving the cam ring 22. An inner surface of the lower portion of the finger 22f may taper inwardly from the upper portion of the finger to almost a bottom of the finger. The finger 22f may have a stiffness biasing the finger toward a natural position (FIG. 7A) where the teeth or lugs of the finger have a diameter slightly less than a diameter of the bore 3b at the top of the sheath 3.

Alternatively, the sleeve 22 may have a plurality of split fingers instead of the single split finger 22f.

The cam ring 21 may have a solid (not split) wall and a rectangular shape in cross-section. The cam ring 21 may be disposed in a bore of the finger 22f. The cam ring 21 may have an inner diameter less than inner dimeters of both the rim 11m and the base 22e for receiving a bottom of a third installation tool 23. The cam ring 21 may be retained in an upper position (FIG. 7A) by entrapment between the shoulder 22s and the tapered inner surface of the finger 22f. A sliding fit may be formed between an outer surface of the cam ring 21 and the inner surface of the upper portion of the finger 22f.

The third installation tool 23 may include a handle 23h, an adapter 23a, and a shaft 23s connecting the handle to the adapter. The adapter 23h may be cylindrical and have a plurality of keyways 23w formed through a wall thereof and corresponding to the number, location and size of the ribs 11r. The shaft 23s may extend from the adapter 23a for a length sufficient to protrude from a top of the housing 4. A sliding fit may be formed between an outer surface of the adapter 23a and the inner dimeters of both the rim 11m and the base 22e such that the bottom of the adapter may seat onto a top of the cam ring 21.

The third alternative ball deflector 20 may be installed into the bore 3b (in a disengaged position) either manually or using a hook style installation tool (not shown) until the shoulder of the rim 11m seats against the top of the sheath 3. The third installation tool 23 may then be lowered into the bore of the housing 4 until the adapter is adjacent to the grate 11. The third installation tool 23 may then be rotated to align the keyways 23w with the ribs 11r. The third installation tool 23 may then be lowered again until the bottom of the adapter seats onto a top of the cam ring 21. A setting force 24 may then be exerted on the handle 23h to drive the cam ring 21 down a bore of the finger 22f. Driving of the cam ring 21 into the lower portion of the finger 22f may engage an outer surface of the cam ring with the tapered inner surface, thereby radially expanding the finger to an expanded position where the teeth/lugs of the finger engage with an inner surface of the sheath 3 adjacent the bore 3b. Engagement of the teeth/lugs with the sheath 3 may then mount alternative third alternative ball deflector 20 to the sheath to prevent any upward force from removing the third alternative ball deflector from the bore 3b. Driving of the rectangular cam ring 21 through the tapered inner surface of the finger 22f may also deform the lower portion of the finger to create a gripping pressure 25 having an arcuate distribution (phantom line in FIG. 7C depicts expansion of lugs/teeth).

Figure 8A:
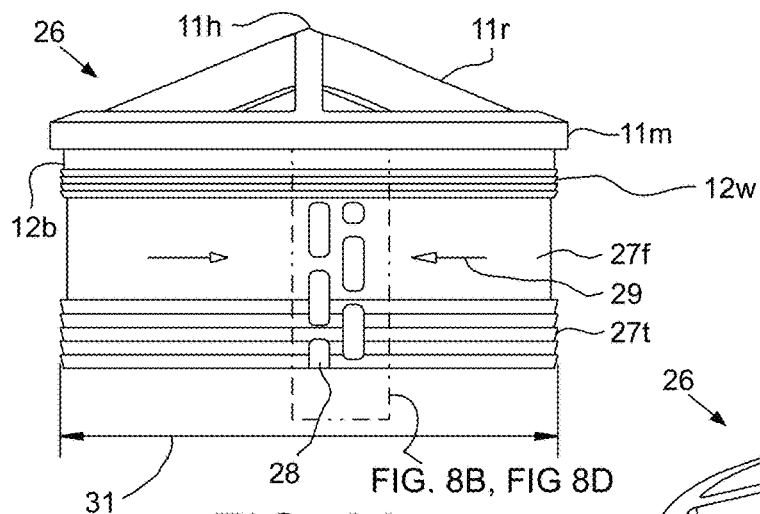
FIGS. 8A and 8C illustrate a fourth alternative ball deflector, according to another embodiment of the present disclosure.
Figure 8C:
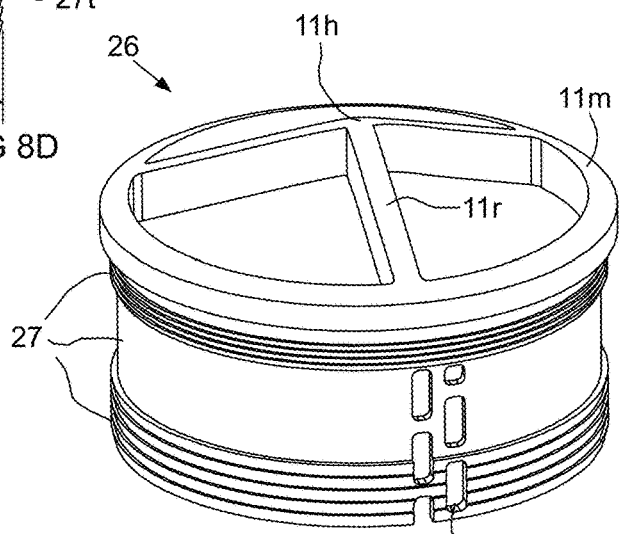
Figure 8B:
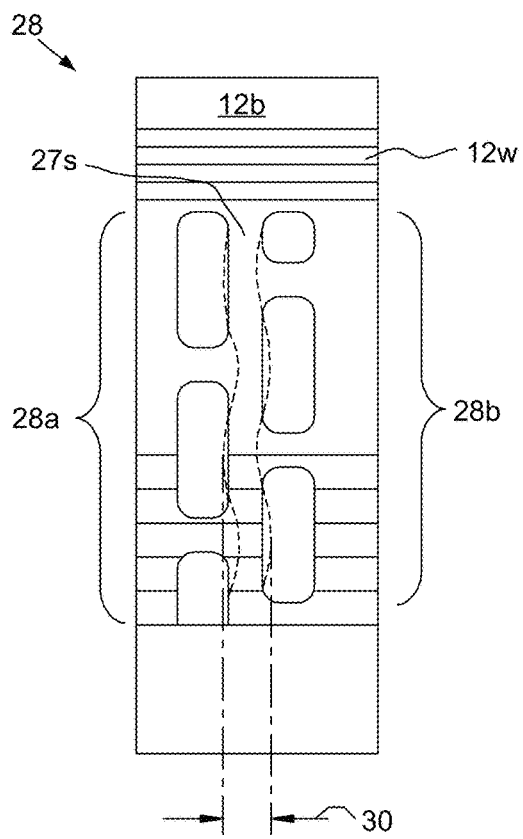
FIGS. 8B and 8D are enlargements of a portion of FIG. 8A.
Figure 8D:
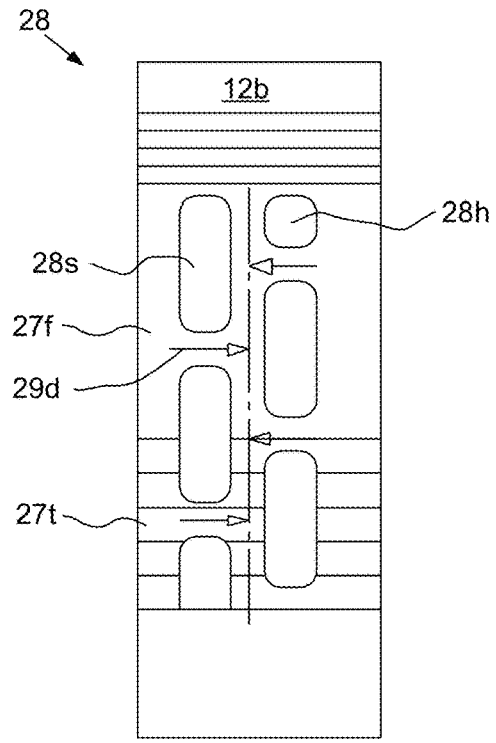

FIGS. 8A and 8C illustrate a fourth alternative ball deflector 26, according to another embodiment of the present disclosure. FIGS. 8B and 8D are enlargements of a portion of FIG. 8A. The fourth alternative ball deflector 26 may be made from any of the materials of the body 7, discussed above. The fourth alternative ball deflector 26 may be of one-piece construction. The fourth alternative ball deflector 26 may be installed into the sheath 3 of the float collar 1 instead of the ball deflector 5. The fourth alternative ball deflector 26 may have the upper grate 11 and a lower anchor 27.

The anchor 27 may include the annular base 12b and a partially split annular finger 27f extending longitudinally from the base. The base 12b may extend from a bottom of the rim 11m. The base 12b may have the plurality of the circumferential teeth 12w formed on an outer surface thereof. A lower portion of the finger 27f may have a plurality of circumferential teeth 27t formed on an outer surface thereof. The teeth 27t may be similar to the teeth 12t. The finger 27f may be split by a perforation 28 having one or more sets 28a,b of apertures, such as holes 28h and/or slots 28s and a strip 27s of the finger 27f separating the sets of apertures. Each aperture may be formed through a wall of the finger 27f. Each set 28a,b of apertures may include a plurality of aligned apertures spaced along a length of the finger 27f. The sets 28a,b of apertures may be adjacent to each other but staggered in an overlapping fashion. The finger 27f may have a stiffness biasing the fingers toward a natural position (shown) where the teeth 12t have a major diameter 31 greater than or equal to a diameter of the bore 3b at the top of the sheath 3.

The fourth alternative ball deflector 26 may be installed in a similar fashion to the ball deflector 5 using the installation tool 14. Driving of the anchor 27 down the bore 3b may exert a compression force 29 by the inner surface of the sheath 3 adjacent the bore 3b radially compressing the finger 27f to a retracted position where the stiffness of the finger exerts a setting force engaging the teeth 12t with an inner surface of the sheath adjacent the bore. Engagement of the teeth 12t with the sheath 3 may then mount the fourth alternative ball deflector 26 to the sheath to prevent any upward force from removing the fourth alternative ball deflector from the bore 3b.

Referring specifically to FIGS. 8B and 8D, due to the staggering of the sets 28a,b of apertures, the compression force 29 may be distributed 29d across the perforation 28 to cause a sinusoidal deformation profile (illustrated in phantom in FIG. 8D) resulting from each slot 28s allowing the adjacent portion of the strip 27s to act as a beam segment. The beam segments may be considered collectively to model the strip 27s as a beam having an effective deflection 30.

Alternatively, due to the relatively high stiffness of the finger 27f, the teeth 27t of the finger and/or the teeth 12w of the base 12b may be omitted.

Alternatively, any of the fingers having teeth may have lugs instead or vice versa.

Figure 9A:
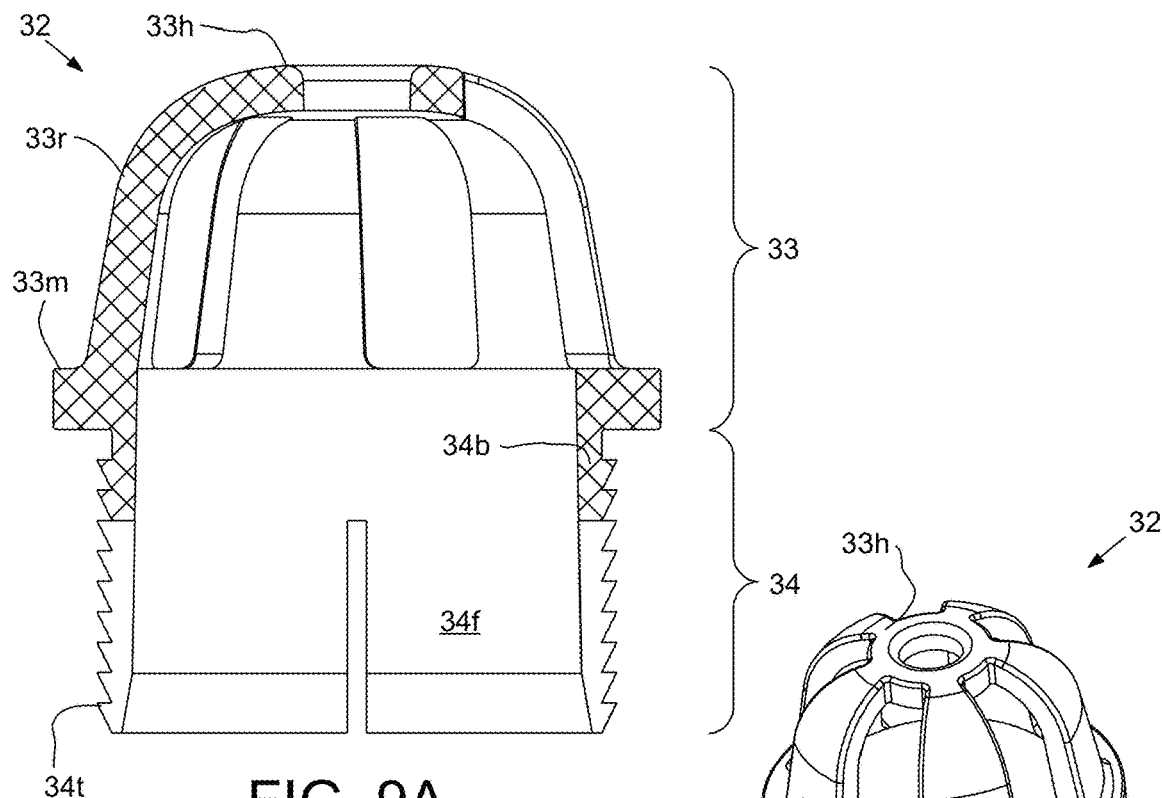
FIGS. 9A, 9B, and 9C illustrate a fifth alternative ball deflector, according to another embodiment of the present disclosure.
Figure 9C:
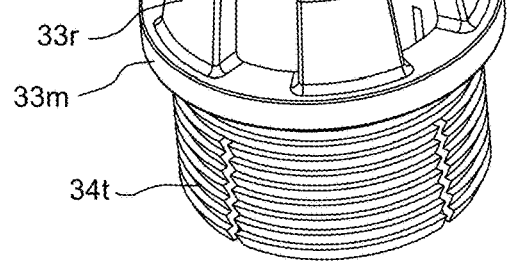
Figure 9B:
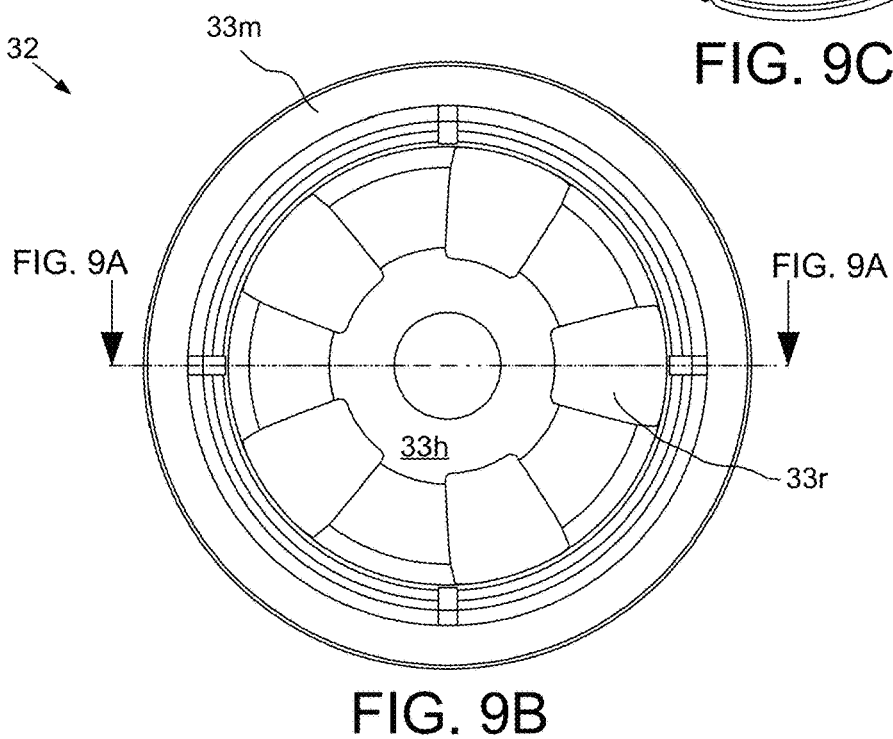

FIGS. 9A, 9B, and 9C illustrate a fifth alternative ball deflector 32, according to another embodiment of the present disclosure. The fifth alternative ball deflector 32 may be made from any of the materials of the body 7, discussed above. The fifth alternative ball deflector 32 may be of one-piece construction. The fifth alternative ball deflector 32 may be installed into the sheath 3 of the float collar 1 instead of the ball deflector 5. The fifth alternative ball deflector 32 may have the upper grate 33 and a lower anchor 34.

The grate 33 may have an outer rim 33m, an inner hub 33h, and a plurality (five shown) of ribs 33r connecting the rim and the hub. The grate 33 may have a dome shape. Ports may be formed between the ribs 33r of the grate 33 and may provide fluid communication between the bore of the housing 4 and the bore 3b of the sheath 3. The hub 33h may also have a port formed therethrough for providing fluid communication between the bore of the housing 4 and the bore 3b of the sheath 3. The ribs 33r may each have an outer portion extending longitudinally from the rim 33m and an inner arcuate portion extending from an end of the outer portion to the hub 33h. The arcuate portions of the ribs 33r may urge a ball (not shown) away from the bore 3b, thereby preventing obstruction of the bore by the ball. The hub 33h may be disc shaped, may be connected to the arcuate portions of the ribs 33r, and may be centrally located. The rim 33m may have an outer diameter that is greater than a diameter of the bore 3b at the top of the sheath 3.

An inner surface of the rim 33m may flare slightly outwardly from an interface with the ribs 33r toward the anchor 34, such as at a first inclination angle relative to a line parallel to a longitudinal axis of the ball deflector 32 less than or equal to five degrees.

The anchor 34 may include an annular base 34b and a plurality of split fingers 34f extending longitudinally from the base. The base 34b may extend from a bottom of the rim 33m. The base 34b may have an outer diameter that is less than a diameter of the bore at the top of the sheath and a shoulder may be formed between the base and the rim. The shoulder may seat against the top of the sheath 3 to prevent the fifth alternative ball deflector 32 from being driven down the bore 3b of the sheath.

Each finger 34f and a lower portion of the base 34b may have a plurality of circumferential teeth 34t formed on an outer surface thereof. Each tooth 34t may have a cross sectional shape resembling a right triangle and the hypotenuses of the teeth of may incline toward the base 34b, thereby providing unidirectional gripping of the sheath 3 adjacent the bore 3b. The fingers 34f may be cantilevered from the base and have a stiffness biasing the fingers toward a natural position where the teeth 34t have a major diameter greater than or equal to a diameter of the bore 3b at the top of the sheath 3. Driving of the anchor 34 down the bore 3b may radially compress the fingers 34f to a retracted position where the stiffness of the fingers exerts a setting force engaging the teeth 34t with an inner surface of the sheath 3 adjacent the bore 3b. Engagement of the teeth 34t with the sheath 3 may then mount the fifth alternative ball deflector 32 to the sheath to prevent any upward force from removing the fifth alternative ball deflector from the bore 3b.

An inner surface of the base 34b may flare slightly outwardly from an interface with the rim 33m toward the fingers 34f, such as at the first inclination angle discussed above with reference to the rim. An inner surface of an upper portion of the fingers 34f may flare slightly outwardly from an interface with the base 34b toward the lower end of the fingers 34f, such as at the first inclination angle discussed above with reference to the base. An inner surface of a lower portion of the fingers 34f may flare outwardly from an interface with the base 34b toward the lower end of the fingers 34f, such as at a second inclination angle which is greater than the first inclination angle, such as being greater than five degrees.

Alternatively, the anchor 34 may only have a single split finger (C-ring) instead of a plurality of split fingers 34f.

The fifth alternative ball deflector 32 may be installed into the bore 3b using an installation tool (not shown) similar to the installation tool 14 except for having a modified adapter having a lower annular portion for receiving the rim 33m and an upper dome shaped portion for receiving the ribs 33r and the hub 33h.

While the foregoing is directed to embodiments of the present disclosure, other and further embodiments of the disclosure may be devised without departing from the basic scope thereof, and the scope of the invention is determined by the claims that follow.

The invention claimed is:

1. A float collar for use in a wellbore, comprising:
a float valve;
a tubular housing having a coupling formed at a longitudinal end thereof for assembly as part of a downhole tubular;
a sheath bonding the float valve to an inner surface of the housing within a flow bore thereof, the sheath having a bore formed therein; and
a ball deflector seated against a top of the sheath and having: an upper grate and a lower anchor engaged with an inner surface of the sheath adjacent the bore, wherein:
the float valve, the sheath, and the ball deflector are made from materials drillable by a polycrystalline diamond compact (PDC) drill bit,
the grate has: an outer rim, an inner hub, a plurality of ribs connecting the rim and the hub, and a plurality of ports formed between the ribs
the anchor has an annular base and a split finger extending longitudinally from the base,
a lower portion of the finger has a plurality of circumferential teeth formed on an outer surface thereof,
the finger is biased toward a natural position, and
the teeth are engaged with the inner surface of the sheath with the finger in a retracted position, and
the base also has a plurality of circumferential teeth formed on an outer surface thereof engaged with the inner surface of the sheath.

2. The float collar of claim 1, wherein a height of each rib is as at least twice a width thereof to maximize flow area of the ports.

3. The float collar of claim 1, wherein the ball deflector is of one-piece construction.

4. A float collar for use in a wellbore, comprising:
a float valve;
a tubular housing having a coupling formed at a longitudinal end thereof for assembly as part of a downhole tubular;
a sheath bonding the float valve to an inner surface of the housing within a flow bore thereof, the sheath having a bore formed therein; and
a ball deflector seated against a top of the sheath and having: an upper grate and a lower anchor engaged with an inner surface of the sheath adjacent the bore, wherein:
the float valve, the sheath, and the ball deflector are made from materials drillable by a polycrystalline diamond compact (PDC) drill bit,
the grate has: an outer rim, an inner hub, a plurality of ribs connecting the rim and the hub, and a plurality of ports formed between the ribs,
the anchor comprises an inner mandrel extending from the rim and an outer sleeve disposed around the mandrel,
the sleeve has an annular base and a split finger extending longitudinally from the base,
the finger has a plurality of circumferential lugs formed on an outer surface thereof,
the finger is biased toward a natural position,
at least one of the lugs is engaged with the inner surface of the sheath with the finger in an expanded position,
the mandrel has a tapered outer surface and the finger has a tapered inner surface, and
driving of the mandrel into the sleeve is operable to expand the finger.

5. The float collar of claim 4, wherein a wall of the mandrel is solid.

6. The float collar of claim 4, wherein:
the sleeve has a plurality of circumferential beads protruding from an inner surface of the base,
the mandrel has a plurality of grooves formed in an outer surface thereof, and
each bead is received in a respective groove, thereby mounting the sleeve onto the mandrel.

7. A float collar for use in a wellbore, comprising:
a float valve;
a tubular housing having a coupling formed at a longitudinal end thereof for assembly as part of a downhole tubular;
a sheath bonding the float valve to an inner surface of the housing within a flow bore thereof, the sheath having a bore formed therein; and
a ball deflector seated against a top of the sheath and having: an upper grate and a lower anchor engaged with an inner surface of the sheath adjacent the bore, wherein:
the float valve, the sheath, and the ball deflector are made from materials drillable by a polycrystalline diamond compact (PDC) drill bit, and
the ball deflector is a wire coiled into a spring and having a helical lower portion serving as the anchor, a conical upper portion serving as the grate, and an oversized shoulder portion.

8. The float collar of claim 7, wherein a free end of the helical portion is centrally located for engagement with an installation tool.

9. A float collar for use in a wellbore, comprising:
a float valve;
a tubular housing having a coupling formed at a longitudinal end thereof for assembly as part of a downhole tubular;
a sheath bonding the float valve to an inner surface of the housing within a flow bore thereof, the sheath having a bore formed therein; and
a ball deflector seated against a top of the sheath and having: an upper grate and a lower anchor engaged with an inner surface of the sheath adjacent the bore,
wherein:
the float valve, the sheath, and the ball deflector are made from materials drillable by a polycrystalline diamond compact (PDC) drill bit,
the grate has: an outer rim, an inner hub, a plurality of ribs connecting the rim and the hub, and a plurality of ports formed between the ribs
the anchor comprises a sleeve extending from the rim,
the sleeve has an annular base and a split finger extending longitudinally from the base,
an upper portion of the finger has a straight inner surface and a lower portion of the finger has a tapered inner surface,
the anchor further comprises a cam ring disposed in a bore of the finger and movable between the upper and lower portions of the finger,
the finger has a plurality of circumferential lugs or teeth formed on an outer surface thereof,
the finger is biased toward a natural position,
the lugs or teeth are engaged with the inner surface of the sheath with the finger in an expanded position, and
driving of the cam ring into the lower portion of the finger is operable to expand the finger.

10. A float collar for use in a wellbore, comprising:
a float valve;
a tubular housing having a coupling formed at a longitudinal end thereof for assembly as part of a downhole tubular;
a sheath bonding the float valve to an inner surface of the housing within a flow bore thereof, the sheath having a bore formed therein; and
a ball deflector seated against a top of the sheath and having: an upper grate and a lower anchor engaged with an inner surface of the sheath adjacent the bore,
wherein:
the float valve, the sheath, and the ball deflector are made from materials drillable by a polycrystalline diamond compact (PDC) drill bit,
the grate has: an outer rim, an inner hub, a plurality of ribs connecting the rim and the hub, and a plurality of ports formed between the ribs,
the anchor has an annular base and a partially split finger extending longitudinally from the base, and
the finger is partially split by a perforation.

11. The float collar of claim 10, wherein:
the perforation has a pair of sets of apertures,
each set of apertures including plurality of aligned apertures spaced along a length of the finger, and
a strip of the finger separates the sets of apertures.

12. The float collar of claim 11, wherein
each set of apertures has one or more slots, and
the slots of one of the sets of apertures are staggered relative to the slots of the other set.

* * * * *